3,501,453
BASIC DYES
Willy Steinemann, Basel, Switzerland, assignor to Sandoz Ltd. (also known as Sandoz A.G.), Basel, Switzerland
No Drawing. Filed Nov. 8, 1966, Ser. No. 592,712
Claims priority, application Switzerland, Nov. 12, 1965, 15,665/65; Feb. 8, 1966, 1,754/66
Int. Cl. C09b 29/02, 43/12; D06p 1/02
U.S. Cl. 260—156                              9 Claims

ABSTRACT OF THE DISCLOSURE

Pyridinium - carbonamidobenzene - azo - (o-hydroxybenzene) dyes free from sulfonic acid groups yield dyeings with deep level shades having good light and wetfastness when applied to acrylonitrile polymers.

---

This invention relates to basic dyes free from sulphonic acid groups and a process for the production of these dyes. The have the formula

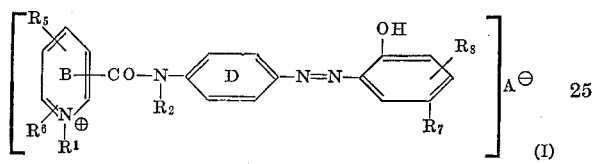

(I)

where:
$R_1$ stands for hydrogen or a substituted or unsubstituted alkyl, cycloalkyl or aralkyl radical,
$R_2$ stands for hydrogen or a substituted or unsubstituted alkyl radical, each of the radicals
$R_5$ and $R_6$ stands for hydrogen, halogen or a substituted or unsubstituted alkyl or alkoxy radical,
$R_7$ stands for hydrogen or a non-water-solubilising substituent, preferably a substituted or unsubstituted alkyl or alkoxy radical,
$R_8$ stands for hydrogen, halogen, nitro or a substituted or substituted alkyl or alkoxy radical and
$A^\ominus$ stands for an anion equivalent to the dye cation, and in which the ring D may be further substituted.

The new dyes of Formula I can be obtained by condensing a compound of the formula

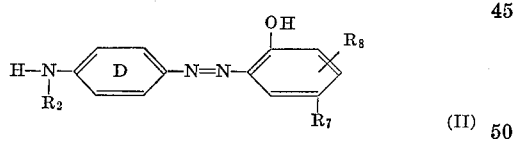

(II)

with a carboxylic acid of the formula

Z—COOH             (III)

or with one of its functional derivatives, for example an acid halide, such as an acid chloride or bromide, wherein Z represents a radical of the formula

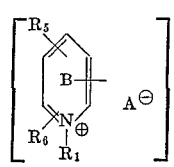

(IV)

or a radical of the formula

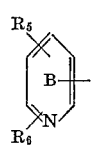

(V)

When Z is a radical of Formula V, a compound of the formula $R_1$—A                  (VI)

is added on to the reaction product.
Certain of these dyes, for example those of the formula

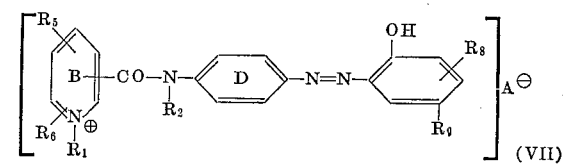

(VII)

where $R_9$ represents a substituted or unsubstituted alkyl or alkoxy radicals, can be obtained by coupling the diazo component of an amine of the formula

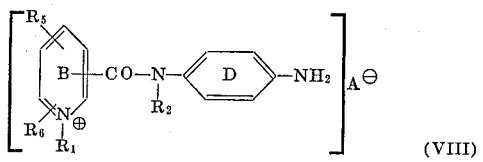

(VIII)

with a coupling component of the formula

(IX)

The dyes of Formula I can also be produced by coupling the diazo compound of an amine of the formula

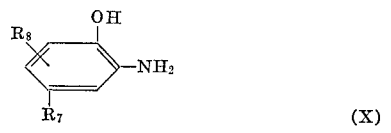

(X)

with a coupling component of the formula

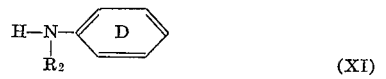

(XI)

and treating the resulting compound of Formula II with a carboxylic acid of Formula III or with one of the functional derivatives of such an acid to convert it into a dye of Formula I.

Particularly good dyes are those corresponding to the formula

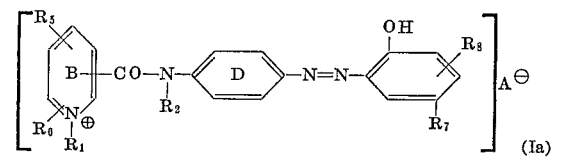

(Ia)

in which the ring D is substituted by halogen or by alkyl or alkoxy which may be further substituted, those of the formula

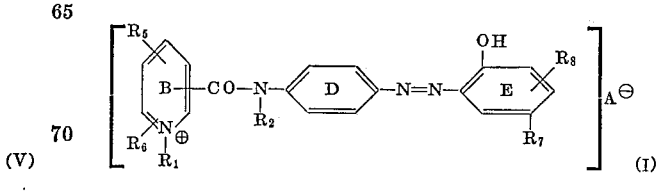

(I)

in which the ring E bears at least one alkoxy group, and those of the formula

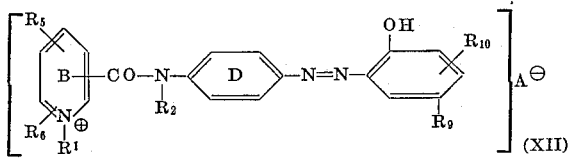

where:

R₉ represents a substituted or unsubstituted alkyl or alkoxy radical, and

R₁₀ halogen or a substituted or unsubstituted alkyl or alkoxy radical.

The azo coupling reaction can be effected in the known way in an alkaline to acid medium which may be buffered if necessary.

The condensation reaction can be carried out in an organic solvent in the presence of an acid or water acceptor, as required, and at high temperatures, for example at 20 to 150° C. or preferably 70 to 120° C. It is possible to work without solvent when one of the compounds can be employed in the liquid state; in such cases this particular reactant is best employed in excess.

The ring D may be substituted by halogen or by alkyl or alkoxy which may be further substiuted.

The anion A⊖ may be an organic or inorganic ion, for example a halogen ion, such as chloride, bromide and iodide; methyl sulphate; sulphate; disulphate; perchlorate; phosphorus tungsten molybdate; benzene sulphonate; 4-chlorbenzene sulphonate; oxalate; maleinate; acetate; propionate; methanesulphonate; chloroacetate or benzoate; or a complex anion, such as those of zinc chloride double salts.

Examples of suitable compounds of Formula VI are alkylating or quaternating agents, e.g. the esters of strong mineral acids and organic sulphonic acids, such as alkylchlorides, alkylbromides, alkyliodides or alkylsulphates, e.g. methyliodide, -bromide or -chloride, dimethylsulphate, aralkyl halides, the esters of lower alkanesulphonic acids which may be α-halogenated, such as the alkyl esters of methane-, ethane- or butane-sulphonic acids, the esters of benzene-sulphonic acids which may be further substituted, such as the methyl, ethyl, propyl or n-butyl esters of benzene-sulphonic acid, 2- or 4-methylbenzene-sulphonic acid, 4-chlorobenzenesulphonic acid or 3- or 4-nitrobenzenesulphonic acid. The addition reaction, i.e. the quaternation or alkylation, is carried out preferably in an inert solvent or if suitable in aqueous suspension, or without solvent in an excess of the alkylating agent at temperatures above −10° C. The medium may be buffered if necessary.

The dyes thus formed can be isolated by standard methods, such as evaporation, precipitation, distillation, filtration, decantation, etc. If necessary they are purified, but if already of sufficient purity they are used as obtained.

Examples of suitable alkyl radicals which may bear 1 to 12 or preferably 1 to 6 carbon atoms and may be substituted are methyl, ethyl, propyl, tert. butyl, tert. amyl, hydroxyethyl, chloroethyl and cyanoethyl. Examples of suitable alkoxy radicals which may contain 1 to 6 or preferably 1 to 4 carbon atoms and may be substituted are methoxy, ethoxy, and butoxy. Halogen may be chlorine, bromine or fluorine. The cycloalkyl radical represents preferably a cyclohexyl radical; the aralkyl radical may be, for example, a benzyl radical.

In Example 10 of German application No. 1,044,023, which has been placed open to public inspection, a process is described for dyeing polyacrylonitrile fibres with dyes including a basic dye of the formula

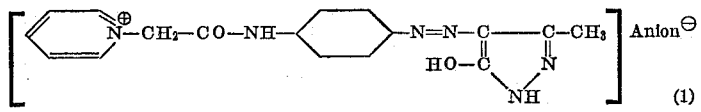 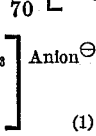

In this specification it is stated that phenol or 2-naphthol can be used in place of pyrazolone as coupling component for the formation of the aforenamed dye.

It is known from French Patent No. 1,257,255, Example 1, that polyacrylonitrile fibres can be dyed with the dye of the following formula

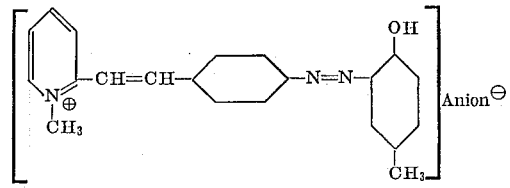

The dyes of Formula I have better levelling properties than the aforecited dyes, give dyeings of greater depth and higher light fastness, and can be applied within a wider pH range. They are used preferably for dyeing, padding or printing filaments, fibres or textile materials of polyacrylonitrile or acrylonitrile copolymer fibers, on which they give deep, level shades having good fastness to light and wet treatments, especially washing, water, sea water, perspiration, decatising, cross dyeing, dry cleaning and solvents, and good resistance to heat, sublimation, ironing and pleating. They show good compatibility with salt and are well soluble, particularly in water.

Acrylonitrile copolymer fibres generally consist of 80 to 95% acrylonitrile and 20 to 5% vinyl acetate, vinyl pyridine, vinyl chloride, vinylidene chloride, acrylic acid, acrylic acid ester, methacrylic acid, methacrylic acid ester etc.

These fibres can be dyed in blends with others. Dyeing is generally carried out in an aqueous medium of alkaline, neutral or acid reaction at 80 to 100° C. or preferably at the boil, or at temperatures above 100° C. with pressure. At these temperatures very level dyeing are obtained without the assistance of retarders. Blend fabrics containing a polyacrylonitrile fibre component can be successively dyed with the dyes of the present invention. They are also suitable for the mass dyeing of polyacrylonitrile in light- and wet-fast shades and for the coloration of oils, paint media, plastic moulding compounds, spinning solution of fibre-forming materials, and polyesters or polyolefins modified by the introduction of acid groups. The new dyes can also be used for dyeing cotton including tannin-treated cotton, wool, silk, regenerated cellulosic fibres, polyamide fibres and paper in all forms occurring in manufacture. They are also suitable for leather dyeing. It has been found that mixtures of two or more dyes of Formula I can be used with advantage.

In the following examples the parts and percentages are by weight and the temperatures are given in degrees centigrade.

EXAMPLE 1

A solution of 25.7 parts of 4-amino-2-methyl-2′-hydroxy-5-methoxy-1,1′-azobenzene in 220 parts of chlorobenzene is raised to 100° and at this temperature nicotinyl chloride is dropped in over a period of 2 hours to acylate the amino group of the aminoazo dye.

On completion of acylation, 25 parts of dimethylsulphate are added over 30 minutes, and the mixture is then boiled for 1 hour with reflux. On cooling, the quaternary dye which has the formula

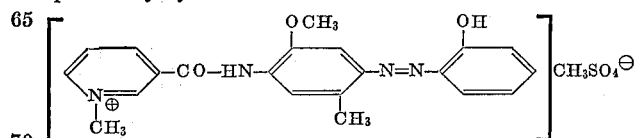

is collected on a filter and if necessary is purified by re-crystallisation from aqueous solution. It dyes polyacrylonitrile fibres in greenish yellow shade of good levelness and excellent fastness. The shade of the dyeings is pH-stable.

EXAMPLE 2

15 parts of fine cast-iron chips are suspended in 100 parts of 1% acetic acid by stirring. The suspension is raised to 95° and after 20 minutes at this temperature 18.5 parts of 1-methylpyridinium-3-carboxylic acid-4'-nitranilidemethylsulphate are added. After a further 20 minutes at 95° the suspension is adjusted with sodium carbonate to give a marked alkaline reaction to phenolphthalein. The reduction solution is filtered free of the iron scum and the clean filtrate cooled to 0°. It is diazotised with 3.3 parts of sodium nitrite and 30% hydrochloric acid at 0 to 5° in the normal way and the diazo compound is coupled with 6 parts of 1-hydroxy-4-methyl-benzene in 80 parts of water in the presence of sodium nicotinic acid chloride in 200 parts of toluene at 80–90°. Stirring is continued for 1 hour, after which time 27.3 parts of 4-amino-2,5-dimethoxy-2'-hydroxy-1,1'-azobenzene in fine powder form are added at 80–90°. The reaction temperature is increased to 108° and this temperature maintained until the development of hydrogen chloride has ceased. On cooling, the precipitated dye is collected on a filter and purified by re-crystallization from water. It gives yellow dyeings of excellent fastness on polyacrylonitrile fibres, which are very level and show very good stability to pH changes.

The mode of operation described in Example 1 can be employed for the production of cationic dyes of similar structure using the diazo, azo and acylating components listed in the following Table A.

TABLE A

| Example | Diazo component | Azo component | Acylating component | Shade of dyeing on polyacrylonitrile fibres |
|---|---|---|---|---|
| 4 | 2-amino-1-hydroxy-4-chlorobenzene | 1-amino-2-methoxy-5-methylbenzene | Nicotinyl chloride | Yellow. |
| 5 | 2-amino-1-hydroxy-4-methylbenzene | do | do | Do. |
| 6 | 2-amino-1-hydroxy-benzene | do | Picolinic acid chloride | Do. |
| 7 | 1-amino-2-hydroxy-4-nitrobenzene | 1-amino-2,5-dimethylbenzene | do | Red-yellow. |
| 8 | 2-amino-1-hydroxy-benzene | 1-amino-3-methoxy-benzene | Isonicotinic acid chloride | Yellow. |
| 9 | 2-amino-1-hydroxy-4-nitrobenzene | 1-amino-3-methyl-benzene | do | Do. | carbonate at 0–15° and pH 9.0–9.5. When the coupling reaction is complete, the pH of the solution is adjusted to 1.0–2.0 by dropping in 30% hydrochloric acid. It is then raised to 45° and held at this temperature for 15

Employing the mode of operation of Example 2, cationic dyes of similar structure can be obtained with the diazo and coupling components listed in the following Table B.

TABLE B

| Example | Diazo component | Coupling component | Shade of dyeing on polyacrylonitrile fibres |
|---|---|---|---|
| 10 | Methyl sulphate of 4'-amino-1-methyl-pyridinium-3-carboxylic acid anilide | 1-hydroxy-2,4-dimethylbenzene | Yellow. |
| 11 | Methyl sulphate of 4'-amino-1,3'-dimethyl-pyridinium-3-carboxylic-acid anilide | 1-hydroxy-3,4-dimethylbenzene | Do. |
| 12 | Methyl sulphate of 4'-amino-3'-chloro-1-methylpyridinium-3-carboxylic acid anilide | do | Do. |
| 13 | Methyl sulphate of 4'-amino-1,2',5'-trimethylpryidinium-3-carboxylic acid anilide | 1-hydroxy-2,4-dimethylbenzene | Do. |
| 14 | do | 1-hydroxy-4-methoxybenzene | Reddish yellow. |
| 15 | do | 1-hydroxy-4-tert. butylbenzene | Yellow. |
| 16 | Methyl sulphate of 4'-amino-1-methyl-pyridinium-2-carboxylic acid anilide | 1-hydroxy-2,4-dimethoxybutyl | Orange. |
| 17 | Methyl sulphate of 4'-amino-1-methyl-pyridinium-4-carboxylic acid anilide | 1-hydroxy-4-ethoxybenzene | Reddish yellow. |
| 18 | Chlorohydrate of 4'-amino-1-methyl-pyridinium-4-carboxylic acid anilide | 1-hydroxy-3,4-dimethylbenzene | Yellow. |
| 19 | do | 1-hydroxy-4-tert. amylbenzene | Do. |
| 20 | do | 1 hydroxy-2,4-diethoxybenzene | Reddish yellow. |
| 21 | Methyl sulphate of 4'-amino-1-methyl-pyridinium-2-carboxylic acid anilide | 1-hydroxy-3,4-dimethylbenzene | Yellow. |
| 22 | do | 1-hydroxy-2-methoxy-4-methylbenzene | Reddish yellow. |
| 22a | Methyl sulphate of 4'-amino-1-methyl-pyridinium-3-carboxylic acid anilide | 1 hydroxy-3,4-dimethylbenzene | Yellow. | minutes. On cooling, the precipitated yellow dye is filtered off. It is obtained in the pure form by recrystallisation from hot aqueous solution. It dyes polyacrylonitrile fibres in greenish yellow shades of excellent levelness and high light and wet fastness. The shade of the dyeings is pH-stable.

EXAMPLE 3

14.5 parts of dimethyl sulphate are added dropwise in the course of 30 minutes to a solution of 16.4 parts of The mode of operation described in Example 3 can be employed to produce cationic dyestuffs of similar structure using the amino-azo-benzene derivatives and acylating components set out in the following Table C.

TABLE C

| Example | 4-amino-azo-benzene derivative | Acylating component | Shade of dyeing on polyacrylonitrile fibres |
|---|---|---|---|
| 23 | 4-amino-2'-hydroxy-3-methoxy-5'-methyl-1,1'-azobenzene. | 1-methylpyridinium-3-carboxylic acid chloride-methyl sulphate | Yellow. |
| 24 | 4-amino-2'-hydroxy-3,5'-dimethyl-1,1'-azobenzene | do | Do. |
| 25 | do | 1-methylpyridinium 2-carboxylic acid chloride-methyl sulphate | Do. |
| 26 | 4-amino-2'-hydroxy-3'-methoxy-5'-methyl-1,1'-azobenzene. | do | Reddish yellow. |
| 27 | 4-amino-2'-hydroxy-3-chloro-5'-methyl-1,1'-azobenzene. | do | Yellow. |
| 28 | do | 1-methylpyridinium-4-carboxylic acid chloride-methyl sulphate | Do. |
| 29 | 4-amino-2'-hydroxy 5'-methoxy-1,1'-azobenzene | do | Reddish yellow. |
| 30 | 4-amino-2'-hydroxy-2,5-dimethoxy-4'-tert. butyl-1,1'-azobenzene. | do | Orange. |

APPLICATION EXAMPLE A 20 parts of the dye obtained in accordance with Example 1 and 80 parts of dextrin are intimately mixed in a ball mill for 45 minutes. One part of the resulting mixture is pasted with 1 part of 40% acetic acid, 400 parts of distilled water at 60° are run onto the paste with constant stirring and the solution is boiled for a short time. It is diluted wtih 7600 parts of distilled water, and 2 parts of glacial acetic acid are added. 100 parts of polyacrylonitrile fibre are entered into this dyebath at 60°, following a preliminary treatment of 10–15 minutes at 60° in a bath of 8000 parts of water and 2 parts of acetic acid. The dyebath is raised to the boil in 30 minutes and held at the boil for 1 hour. A level greenish yellow dyeing is obtained on the polyacrylonitrile fibre which has excellent light and good wet fastness properties.

EXAMPLE 31

10.9 parts of 1-amino-2-hydroxybenzene are diazotised and the resulting diazo compound is coupled with 13.5 parts of 1-ethylamino-3-methylbenzene in weakly acid medium at 20°. The N-ethylamino-azo dye thus formed is isolated and dried. 12.8 parts of the dye are added to 150 parts of toluene and the solution is raised to 90°, at which temperature nicotinic acid chloride is added gradually over 30 minutes until the free N-ethylamino group is no longer indicated. The dye settles out as a hydrochloric acid salt. It is filtered off and converted into the free base by stirring in a 2% sodium carbonate solution at 20°. The dried nicotinic acid amide dye is dissolved in 250 parts of toluene at 90°, and 12.6 parts of dimethyl sulphate are added to the solution in the course of 1 hour. The precipitated quaternary dye is filtered off, recrystallised from aqueous solution and dried. It dyes polyacrylonitrile fibres in greenish yellow shades of excellent levelness and fastness; the dyeings of this dye are pH-stable.

EXAMPLE 32

22.7 parts of pyridine - 3 - carboxylic acid - N'-methyl-N' - (4" - aminophenyl) - amide are diazotised at 0–5° in aqueous hydrochloric acid solution. The diazo solution is coupled in the normal way with 12.4 parts of 1-hydroxy-4-methoxybenzene in soda-alkaline solution at 0–20°. On completion of coupling, the dye is isolated in the normal way, vacuum dried and dissolved in 600 parts of chlorobenzene at 100°. In the course of 1 hour 26.2 parts of dimethyl sulphate are added to the dye solution at 100°, after which the reaction mixture is boiled for 2 hours with reflux. The precipitated quaternary dye is filtered off, purified by recrystallisation from aqueous solution, dried and ground. It dissolves in water to give yellow-brown solutions and is suitable for dyeing polyacrylonitrile fibres in reddish yellow shades, which have excellent light and wet fastness properties.

Equally good dyes are obtained when the 12.4 parts of 1-hydroxy-4-methoxybenzene used in this Example are replaced by equimolar amounts of 1-hydroxy-2-methoxy-4-methylbenzene, 1-hydroxy-4-ethoxybenzene, 1-hydroxy-3,4-dimethylbenzene, 1-hydroxy-2,4-dimethylbenzene or 1-hydroxy-4-methylbenzene.

Cationic dyes of similar structure can be produced by the method described in Example 31 with the diazo, azo, acylating and quaternating components listed in the following Table D.

TABLE D

| Example No. | Diazo component | Azo component | Acylating component | Quaternating component | Shade of dyeing on polyacrylonitrile fibres |
|---|---|---|---|---|---|
| 33 | 1-amino-2-hydroxybenzene. | 1-methylamino-3-methylbenzene. | Pyridine-3-carboxylic acid chloride. | (CH₃)₂SO₄ | Yellow. |
| 34 | do | 1-methylamino-2,5-dimethylbenzene. | do | (CH₃)₂SO₄ | Do. |
| 35 | 1-amino-2-hydroxy-5-methylbenzene. | do | do | CH₃—⟨⟩—SO₃CH₃ | Do. |
| 36 | do | 1-ethylamino-3-methylbenzene. | do | CH₃—⟨⟩—SO₃CH₃ | Do. |
| 37 | do | do | Pyridine-2-carboxylic acid chloride. | CH₃—⟨⟩—SO₃CH₃ | Do. |
| 38 | do | do | Pyridine-4-carboxylic acid chloride. | n—C₄H₉Br | Do. |
| 39 | 1-amino-2-hydroxybenzene. | do | do | n—C₄H₉Br | Do. |
| 40 | do | do | Pyridine-2-carboxylic acid chloride. | CH₃—⟨⟩—SO₃C₂H₅ | Do. |
| 41 | 1-amino-2-hydroxybenzene. | 1-benzylamino-3-methylbenzene. | do | (CH₃)₂SO₄ | Yellow. |
| 42 | do | do | Pyridine-3-carboxylic acid chloride. | (CH₃)₂SO₄ | Do. |
| 43 | do | do | Pyridine-4-carboxylic acid chloride. | (CH₃)₂SO₄ | Do. |
| 44 | do | 1-ethylamino-2-methoxybenzene. | Pyridine-3-carboxylic acid chloride. | n—C₄H₉Br | Do. |
| 45 | 1-amino-2-hydroxybenzene. | 1-methylamino-2-methoxy-5-methylbenzene. | do | CH₃(SO₄)₂ | Do. |
| 46 | do | 1-ethylamino-3-methoxybenzene. | do | CH₃(SO₄)₂ | Do. |
| 47 | 1-amino-2-hydroxy-5-methoxybenzene. | do | do | CH₃(SO₄)₂ | Reddish yellow. |
| 48 | do | 1-ethylamino-3-methylbenzene. | do | CH₃—⟨⟩—SO₃CH₃ | Do. |
| 49 | do | 1-methylamino-3-methoxybenzene. | do | C₄H₉Br | Do. |
| 50 | 1-amino-2-hydroxy-5-tert.-butylbenzene. | do | do | (CH₃)₂SO₄ | Do. |
| 51 | do | 1-methylamino-2-methylbenzene. | Pyridine-3-carboxylic acid chloride. | (CH₃)₂SO₄ | Yellow. |
| 52 | do | 1-methylamino-3-methylbenzene. | do | (CH₃)₂SO₄ | Do. |

Formulae of representative dyes of the foregoing examples are as follows:

EXAMPLE 1

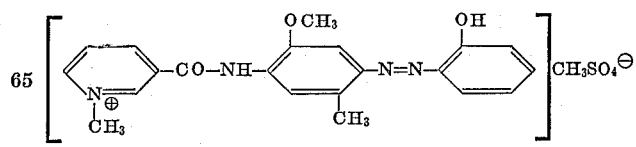

EXAMPLE 2

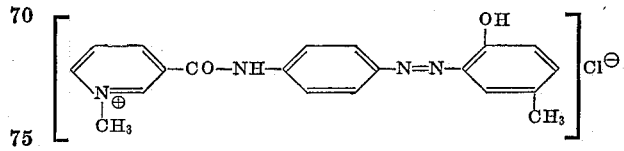

EXAMPLE 6

The basic dye of formula

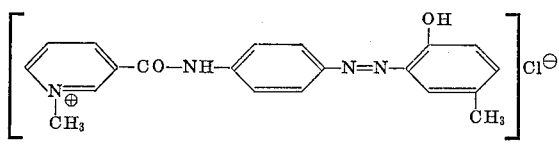

EXAMPLE 7

The basic dye of formula

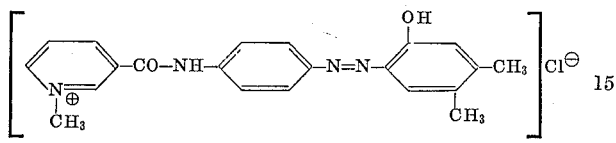

EXAMPLE 8

The basic dye of formula

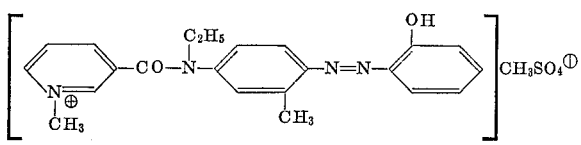

EXAMPLE 9

The basic dye of formula

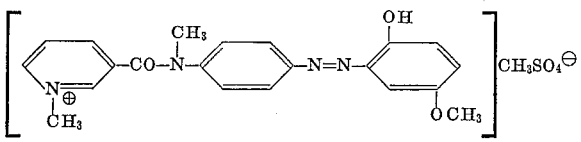

EXAMPLE 22a

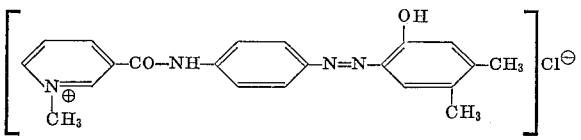

EXAMPLE 31

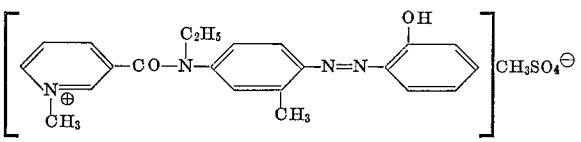

EXAMPLE 32

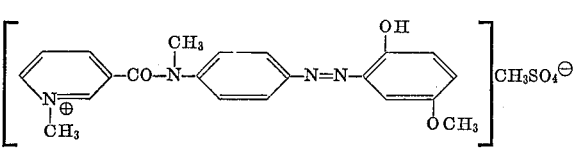

Having thus disclosed the invention, what I claim is:
1. A basic dye free from sulfonic acid groups and of the formula

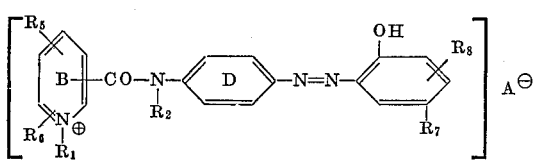

wherein:

$R_1$ is a member selected from the group consisting of hydrogen, alkyl, cyclohexyl, benzyl, substituted alkyl, substituted cyclohexyl and substituted benzyl;

$R_2$ is a member selected from the group consisting of hydrogen, benzyl alkyl and substituted alkyl;

each of $R_5$ and $R_6$ is, independently, a member selected from the group consisting of hydrogen, halo, alkyl, substituted alkyl, alkoxy and substituted alkoxy;

$R_7$ is a member selected from the group consisting of hydrogen, alkyl substituted alkyl, alkoxy, substituted alkoxy, chloro and nitro;

$R_8$ is a member selected from the group consisting of hydrogen, halo, nitro, alkyl, substituted alkyl, alkoxy and substituted alkoxy;

A is an anion equivalent to the dye cation; and any ring D substituent is a member selected from the group consisting of halo, alkyl, alkoxy, substituted alkyl and substituted alkoxy; and in each of the above definitions each alkyl has from 1 to 12 carbon atoms; each alkoxy has from 1 to 6 carbon atoms; and any undefined substituent is a member selected from the group consisting of hydroxy, chloro, methoxy and cyano.

2. A basic dye according to claim 1 wherein ring D is substituted by a member selected from the group consisting of halo, alkyl and alkoxy.

3. A basic dye according to claim 1 wherein at least one of $R_7$ and $R_8$ is alkoxy.

4. A basic dye according to claim 1 wherein $R_7$ is a member selected from the group consisting of alkyl, substituted alkyl, alkoxy and substituted alkoxy; and $R_8$ is a member selected from the group consisting of halo, alkyl, substituted alkyl, alkoxy and substituted alkoxy.

5. The basic dye according to claim 1 of the formula

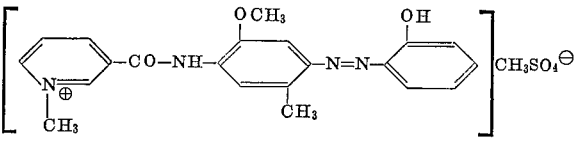

6. The basic dye of the formula

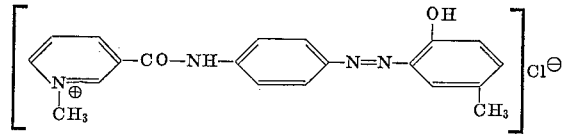

7. The basic dye of the formula

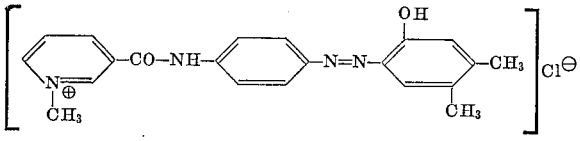

8. The basic dye of the formula

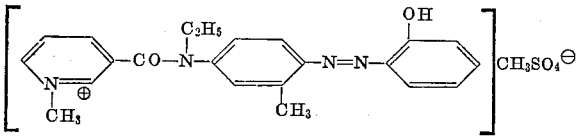

9. The basic dye of the formula

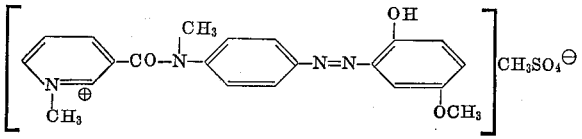

References Cited

UNITED STATES PATENTS

| | | | |
|---|---|---|---|
| 2,365,265 | 12/1944 | Gross | 260—156 |
| 2,821,526 | 1/1958 | Boyd | 260—156 XR |
| 3,117,960 | 1/1964 | Illy | 260—156 |
| 3,148,181 | 9/1964 | Wallace et al. | 260—156 XR |
| 3,312,681 | 4/1967 | Lewis | 260—156 |

FLOYD D. HIGEL, Primary Examiner

U.S. Cl. X.R.

260—295, 146, 142, 205, 295.5; 8—41, 71